Figure 1:
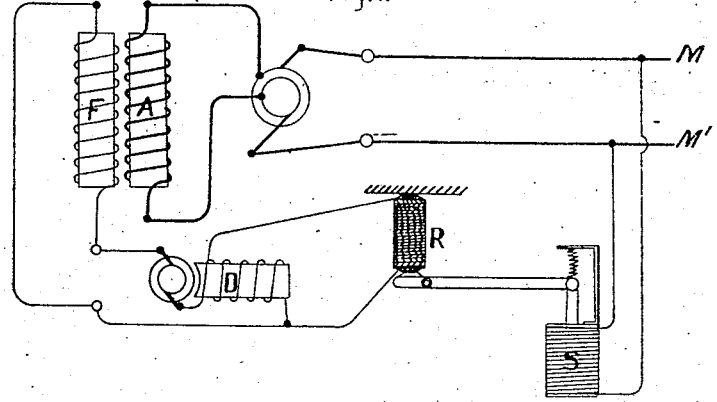

(No Model.) 2 Sheets—Sheet 1.

R. P. SELLON & W. M. MORDEY.
REGULATOR FOR ALTERNATING CURRENT GENERATORS.

No. 392,370. Patented Nov. 6, 1888.

FIG-3-
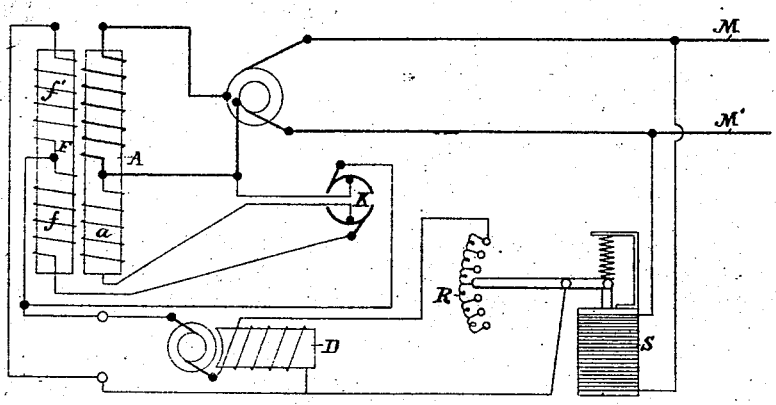
FIG-4-
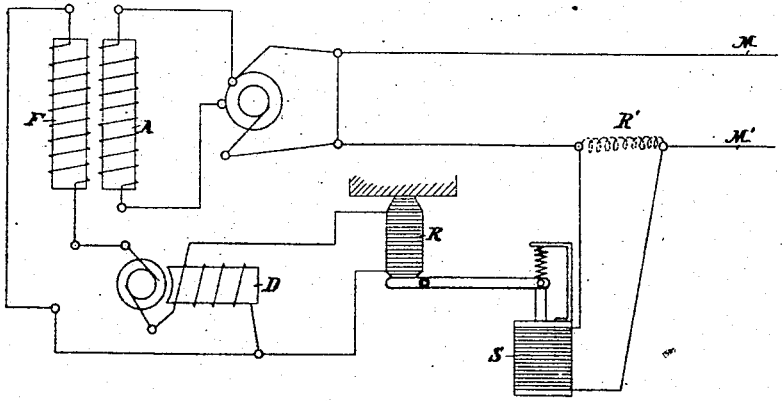

United States Patent Office.

ROBERT PERCY SELLON AND WILLIAM M. MORDEY, OF VICTORIA WORKS, BELVEDERE ROAD, COUNTY OF SURREY, ENGLAND, ASSIGNORS OF ONE-THIRD TO CHARLES E. WEBBER, OF SAME PLACE.

REGULATOR FOR ALTERNATING-CURRENT GENERATORS.

SPECIFICATION forming part of Letters Patent No. 392,370, dated November 6, 1888.

Application filed June 8, 1887. Serial No. 240,656. (No model.) Patented in England December 18, 1886, No. 16,662.

*To all whom it may concern:*

Be it known that we, ROBERT PERCY SELLON, electrical engineer, and WILLIAM MORRIS MORDEY, electrician, subjects of the Queen of Great Britain and Ireland, residing at Victoria Works, Belvedere Road, in the county of Surrey, England, have jointly invented certain new and useful Improvements in Regulating Electric Generators, (for which we and Charles E. Webber have applied for a patent in Great Britain on December 18, 1886, No. 16,662,) of which the following is a specification.

Our invention relates to the regulation of the supply of electrical energy derived from alternate-current machines.

In a system of distribution of electrical energy for lighting, heating, or other purposes it is usual to work either on the "series" system—that is, where the various devices, such as arc or incandescent lamps or groups of them, are placed in electrical series with one another—or on the parallel system—that is, where the devices are placed in derivation across the main wires supplying electricity. In the first case the desideratum is to maintain a constant strength of current throughout the circuit. In the second case the desideratum is to maintain the electro-motive force constant at the points of consumption and approximately constant at the electric generator or generators.

This invention consists in means for regulating the supply of electrical energy from alternate-current generators, so as to attain either of these ends.

The accompanying drawings will serve to make clear the new or improved means for obtaining regulation of the supply of electrical energy from alternate-current dynamo-electric machines.

In the figures similar letters indicate similar parts throughout.

Figures 1, 2, 3, and 4 are diagrams showing such new or improved means.

According to our invention the exciting-current for the field-magnet coils of the generator or generators is usually obtained from a separate dynamo-machine. The exciting-current yielded by this second machine is varied by means of an automatic regulator, which operates as follows: A magnet or magnets or other suitable devices (connected in series relation to the main wires, supposing constant current to be the desideratum, or in shunt relation to the main wires, supposing constant potential to be the desideratum) cause by their action upon an armature or armatures the field-magnets of the second or exciting dynamo to be varied in strength—such as by the action of a resistance placed as a shunt around or in series with the field-magnets of the second or exciting dynamo, the extent of which resistance is varied by the varying attracting force of the magnet or magnets, or by the action of a similarly-actuated switch, whereby suitable variation is made in the number of field-coils of the exciting-dynamo in circuit or by other appropriate action. The controlling electro-magnet or its equivalent must be such as to be actuated by alternating currents, being adapted to respond to such currents by lamination of the iron core, slitting of the metal bobbin where used, or other appropriate means; and we may make use of any device or principle such as the expansion of a wire traversed by the current. Thus a variation from the constancy of the conditions of supply of the primary generators will cause a corresponding variation in the magnet or magnets of the automatic regulator. This again will cause a variation in the strength of the magnetic field of the second or exciting generator, and so cause the latter to yield an increased or diminished exciting-current to the primary generator until the required conditions of supply, whether of constant current or constant potential, are re-established. The tendency will be always to automatically maintain the conditions of supply as nearly constant as possible.

In Fig. 1, A is the armature of an alternate-current generator supplying electrical energy to the mains at M M'; F, the field magnet or magnets of the same, supplied with current by the separate exciting-dynamo D. The field-winding of D is shunted by the variable resistance R, and the magnet S, which controls the variable resistance R, is magnetized by being placed in shunt-connection with the mains M M'. Suppose the conditions of supply in the main circuit M M' depart from the normal, owing to variations in the number of lamps or other translating devices in operation, then such variation will affect the magnet S, causing it to alter the amount of resistance in the shunt-circuit at R, so altering the strength of the exciting-current passing in the field-magnet F until the normal conditions are again restored in the external circuit, M M'.

In Fig. 4 the arrangement is the same as in Fig. 1, except that the regulating-magnet S is shown in series relation with the main conductors M M'. It may be included in said conductors, so as to receive the whole of the current, or the wires leading to the magnet S may form a shunt around a resistance, R', as indicated in dotted lines, so that only a fraction of the current passes through the said magnet. The series connection may of course be applied in like manner to the other arrangements herein referred to.

Figure 2:
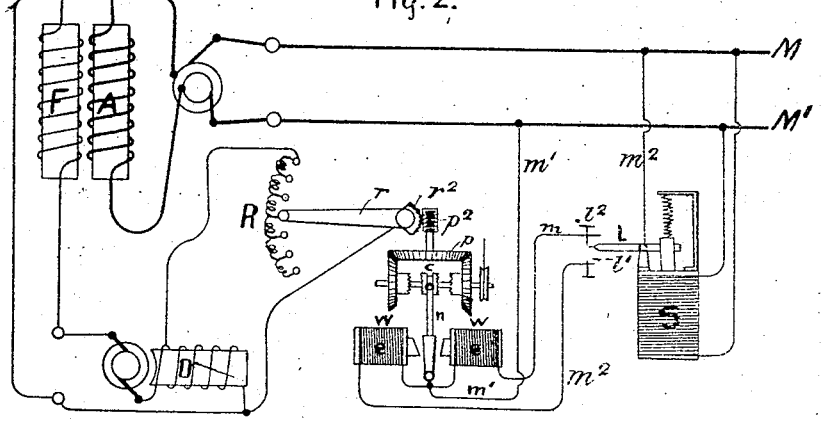

We may employ a regulating-magnet or other suitable device or devices connected in "series" relation to the main wires, if constant current be required, or in "shunt" relation to the main wires, if constant potential be required, which, under small variations from the normal conditions of supply, may throw into operation suitable electrical or mechanical devices for varying the strength of the magnetic field of the second or exciting dynamo, as above described. The regulating-magnet or other controlling device thus operates as a relay. Fig. 2 illustrates this part of the invention. Variations from the normal in the external circuit, M M', which affect the magnet S, cause the lever-arm $l$ to close the circuit of either one or other of the magnets $e$ $e^x$, according as the conditions exceed or fall short of the standard conditions in the external circuit, M M'.

$l'$ $l'$ are the contacts for the lever-arm $l$, and $m$ $m'$ are the circuit-wires for the coils $e$ $e^x$, led off the mains, as shown.

By a suitable device—such as the clutch C—to which rotary or reciprocating motion is imparted in any convenient way, engaging in one or other of the clutch-wheels W W', the resistance R in the exciting-circuit is varied until equilibrium is again restored in the external circuit. The arrangement shown consists of a centered armature, $n$, attracted to one side or the other by the cores of the coils $c$ or $c^x$, according to which coil receives current, so as to move the clutch C into gear with either the wheel W or the wheel W', which are mounted loosely on the shaft by which the clutch C is rotated, and so drive the wheel $p$ and worm $p^2$, and so the quadrant $r'$ and arm $r$ of the contact-maker for the resistance R, in one or other direction to cut resistance in or out.

We may obtain the constant portion of the exciting-current for the primary generator—viz., that portion constituting the fixed strength of field usual to all compound self-regulating machines—from the primary generator direct, the current used for this purpose being commutated, so as to make it continuous within the said fields, the variable or correcting strength of field necessary to produce constant current or constant potential under variations of external work being obtained with or without the use of a relay, as in Figs. 2 and 1, respectively. Thus in Fig. 3 A represents the armature of the alternate-current dynamo-machine, a portion of the current produced by which, as shown at $a$, is used to excite the field F, as shown at $f$, the current used for this purpose being rendered continuous by the commutator K. This provides the fixed portion of the field-magnetism. The variable portion, as shown at $f'$, may be obtained and controlled as in either of the methods shown in Figs. 1 and 2; or we reverse the arrangement and regulate by varying the exciting-current obtained by commutation from the alternate-current generator; or we may regulate both.

We claim as our invention or discovery—

1. The combination, with the alternate-current dynamo, the main circuit supplied thereby, the exciting-dynamo, and the exciting-circuit, which includes the fields of both dynamos, of a shunt on said exciting-circuit around the field of the said exciting-dynamo, a variable resistance in said shunt, and a regulating magnet or device responsive to alternating currents, electrically connected with said main circuit, and having a movable part connected with said resistance, substantially as described.

2. The combination, with the alternate-current dynamo, the main circuit supplied thereby, and the exciting-dynamo, of means for varying the field-circuit of said exciting-dynamo, and a regulating magnet or device responsive to alternating currents, electrically connected with the main circuit, and having a movable part connected with said means, so as automatically to regulate said alternate-current dynamo by operating on the field-circuit of the said exciting-dynamo, substantially as described.

3. The combination, with the alternate-current dynamo, the main circuit supplied thereby, and the exciting-dynamo, of means for varying the field-circuit of the said exciting-dynamo, power mechanism for operating said means, and a relay for bringing said means into action, said relay comprising a regulating magnet or device responsive to alternating currents, electrically connected with the main circuit, and having a movable part which, through the intermediary of the said power mechanism, adjusts said means, and thereby automatically regulates said alternate-current dynamo by operating on the field-circuit of the said exciting-dynamo, substantially as described.

4. The combination, with an alternate-current dynamo, the main circuit supplied thereby, the exciting-dynamo, and the exciting-circuit supplied by the last-mentioned dynamo, of an exciting-circuit which supplies a current from the alternate-current dynamo to excite the field thereof, a commutator in said last-mentioned circuit for converting the alternating into a straight current, means for varying one, at least, of the said exciting-circuits, and a regulating magnet or device responsive to alternating currents, electrically connected with said main circuit, and having a movable part connected with said means, so as automatically to regulate the said alternate-current dynamo through said means, substantially as described.

In testimony whereof we have signed our names to this specification in the presence of two subscribing witnesses.

ROBERT PERCY SELLON.
W. M. MORDEY.

Witnesses:
   CHAS. JAS. JONES,
   HENRY NEWBY,
Both of 47 Lincoln's Inn Fields, London.